(No Model.) 3 Sheets—Sheet 1.
P. P. MAST.
STREET CAR MOTOR.
No. 577,050. Patented Feb. 16, 1897.
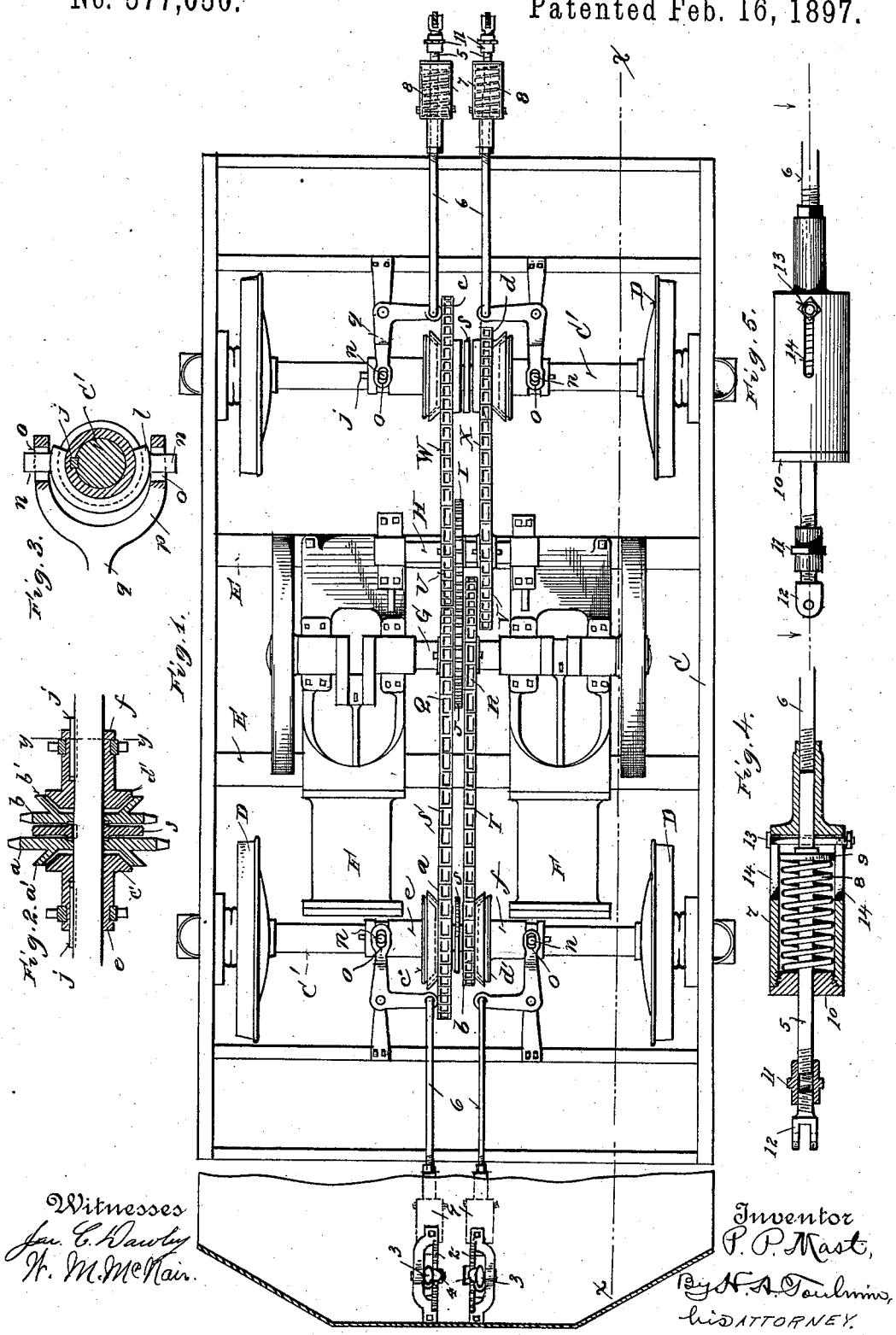

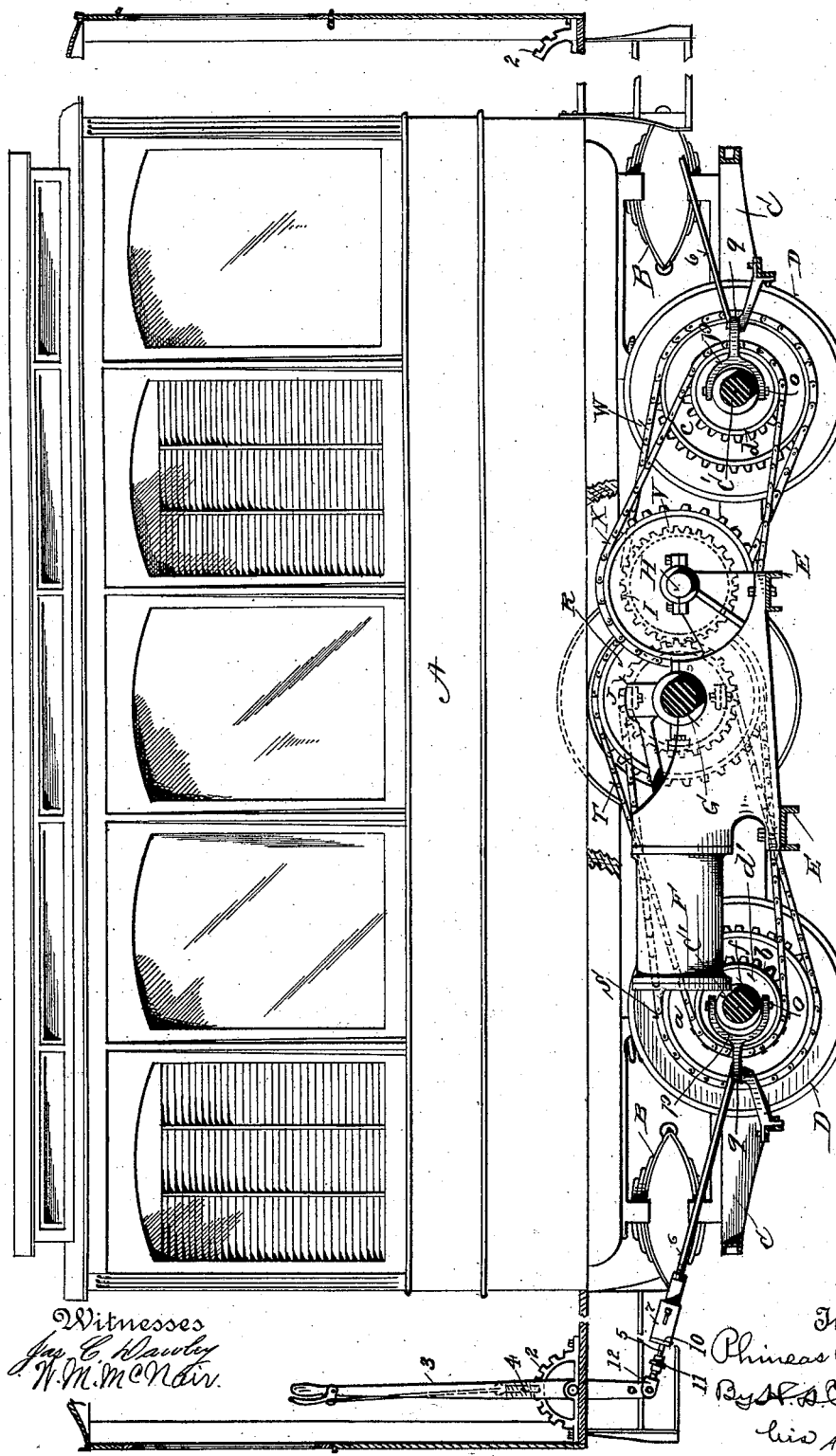

(No Model.) 3 Sheets—Sheet 3.
P. P. MAST.
STREET CAR MOTOR.
No. 577,050. Patented Feb. 16, 1897.
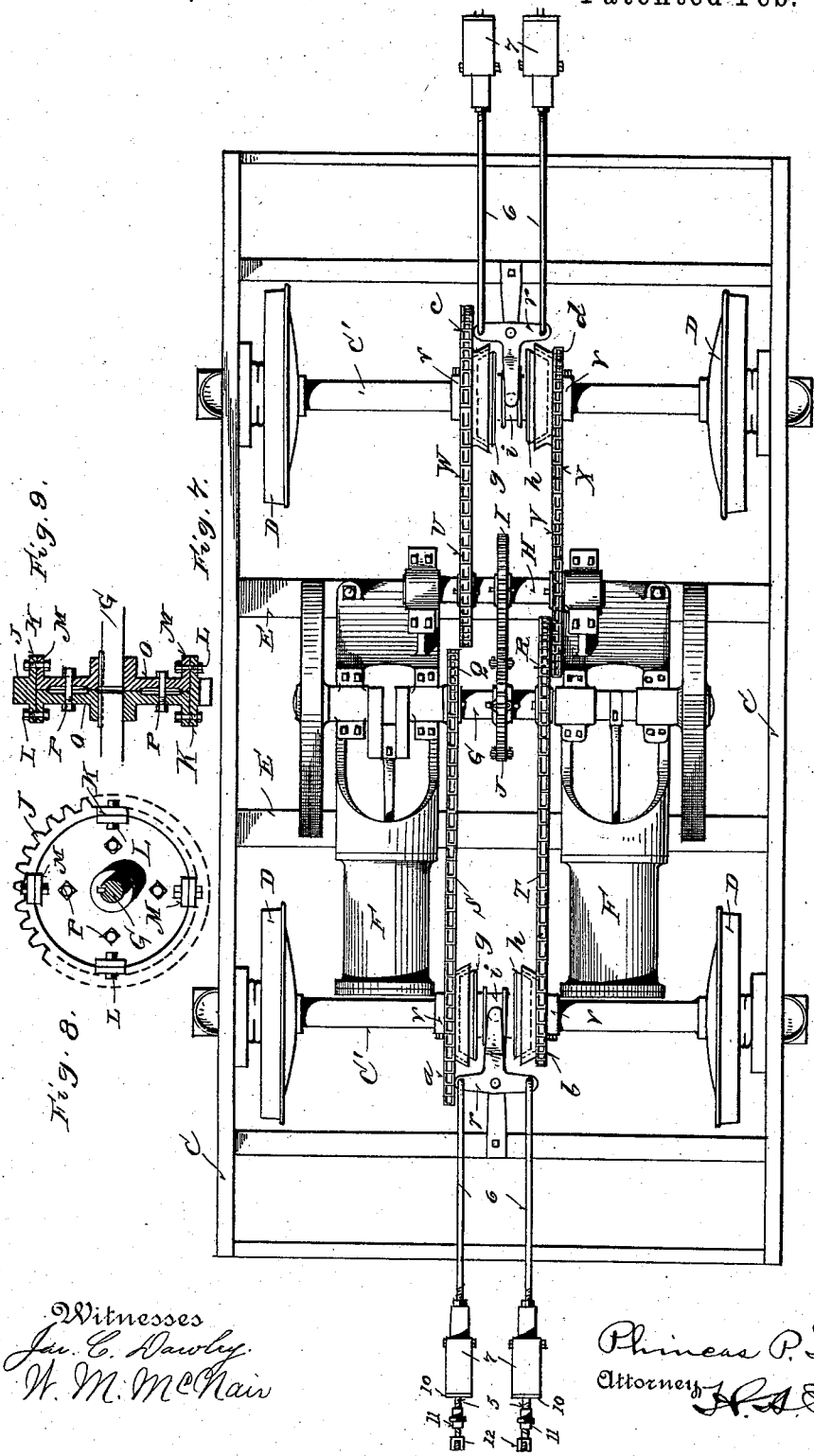
Witnesses
Jas. C. Dawley
W. M. McNair
Inventor
Phineas P. Mast,
Attorney
H. A. Toulmin

UNITED STATES PATENT OFFICE.

PHINEAS P. MAST, OF SPRINGFIELD, OHIO.

STREET-CAR MOTOR.

SPECIFICATION forming part of Letters Patent No. 577,050, dated February 16, 1897.

Application filed June 1, 1896. Serial No. 593,702. (No model.)

*To all whom it may concern:*

Be it known that I, PHINEAS P. MAST, a citizen of the United States, residing at Springfield, in the county of Clark and State of Ohio, have invented certain new and useful Improvements in Street-Car Motors, of which the following is a specification, reference being had therein to the accompanying drawings.

This invention relates to certain new and useful improvements in street-car motors.

The leading object of my invention is to provide a source of power which is adequate to running on level or nearly level ground and is convertible into what is adequate to start the car and what is adequate to drive the car uphill, such power under all those conditions being derived from the same source and being convertible for each of said purposes irrespective of any increase of the power itself, which is practically constant. These things I accomplish by the mechanism indicated in the next paragraph.

The essential feature of my invention consists of a combination of mechanism composed of the car-axles, different-sized operating-wheels thereon for varying the speed and power, suitable clutch devices for clutching said wheels to said axle, mechanism extending from the clutch devices to the operator's stand, a driving or motor shaft rotatable continuously in one direction, a counter-shaft rotated thereby in the opposite direction, a connecting mechanism between said driving-shaft and each of the different-sized wheels on one axle, and connecting mechanism between the said counter-shaft and each of the different-sized wheels on the other axle.

Another object of my invention is to provide a connecting mechanism between the hand-lever employed by the operator and the clutch devices, which through a tensile strain operates to set the clutch devices in clutching position, but which yields with a spring action to the unclutching movements of the clutch devices.

A further object of my invention is to construct a peculiar combination of friction operating-clutches and operating-wheels.

A still further object of my invention is to construct a combined coupler for a divided driving-shaft and gear-wheel for operating the counter-shaft.

In the accompanying drawings, on which like reference letters and numerals indicate corresponding parts, Figure 1 is a plan view of a car-truck with my improved motor applied thereto; Fig. 2, a longitudinal sectional view of my preferred form of operating-clutch and operating-wheels; Fig. 3, a detail sectional view on the line *y y* of Fig. 2, showing the connection of one of the clutches with its lever; Fig. 4, a longitudinal sectional view and partial side view of one of the clutch-operating rods; Fig. 5, a plan view of the same; Fig. 6, a longitudinal sectional view of a car-truck with the body partly in side elevation, the section being on the line *x x* of Fig. 1; Fig. 7, a similar view to Fig. 1, showing a modified form of operating-clutch; Fig. 8, a side elevation of the driving-shaft coupling and the driving-gear, and Fig. 9 a diametrical sectional view of such coupling and gear.

The letter A designates a car-body of any approved type, mounted, as usual, through suitable springs B, on a truck-frame C, carried on axles C', having truck-wheels D. These parts are constructed as usual or in any approved manner for my purposes. On cross-beams E, I mount and secure gasolene-engines F of any of the approved types, preferably of the type being manufactured and sold by the Foos Gas Engine Company, of Springfield, Ohio. I refer to this engine specifically because it is well known on the market and a reference to it designates a type of engine which may be employed for my purposes. The bed-plate of this engine is fashioned to conveniently be secured to the cross-beams E, as seen in Fig. 6. This bed-plate carries a divided or two-part driving-shaft G and a counter-shaft H. These shafts are geared together, preferably by means of spur-gears I and J. The latter is peculiar in its construction, consisting of a toothed rim with lugs K at intervals, adapted to be secured by bolts L to similar lugs M, projecting from plates O, which are keyed, respectively, to the sections or divisions of a driving-shaft G. These plates are secured together, as by bolts P. Thus the divisions of the shaft G are coupled. I adopt this construction to enable me to place the driving spur-gear J on the engine-shaft, notwithstanding it has two cranks.

On the driving-shaft G, I also place two sprocket-wheels Q and R, the former being the smaller of the two. On these sprocket-gears I mount sprocket-chains S and T, respectively.

On the counter-shaft H, I mount a corresponding set of sprocket-wheels U and V, the former being the smaller. On these sprocket-wheels I mount a similar pair of chains W and X.

The sprocket-chains S and T, respectively, run to and fit upon operating-wheels $a$ and $b$ on one axle of the car. The sprocket-chains W and X, respectively, run to and fit upon other operating-wheels $c$ and $d$ on the other car-axle.

The operating-wheel $a$ is as much larger than the operating-wheel $b$ as the driving-wheel Q is smaller than the driving-wheel R; also, the operating-wheel $c$ is as much larger than the operating-wheel $b$ as the driving-wheel U is smaller than the driving-wheel V. Thus the driving-wheel Q, the chain S, and the operating-wheel $a$ are used to start the car in one direction or to operate the car up steep hills, or such hills as require extra power by reason of their grade, while the driving-wheel U, the sprocket-chain W, and the operating-wheel $c$ are used under similar conditions for driving the car in the other direction. On the other hand, the driving-wheel R, sprocket-chain T, and operating-wheel $b$ are used to drive the car in one direction on level or comparatively level ground, or even to start it when the load is light, or comparatively so, while the driving-wheel V, the sprocket-chain X, and the operating-wheel $d$ are used under like conditions to drive the car in the other direction.

Thus it will be seen that the first object of my invention is carried out by the general combination of mechanism set forth in the introductory preamble following the statement of said object in the beginning of this specification. In stating such general combination I did not limit myself to the use of sprocket-wheels and sprocket-chains. In illustrating one form of my combination and in describing it in detail just above I have specified such type of wheels and chains. I do this under the statute requiring the description and exemplification of what is regarded as the best form, but I wish to be understood as claiming such combination even though some other type of connecting mechanism between the driving-shaft and one of the axles, on the one hand, and the counter-shaft and the other axle, on the other hand, be employed, so long as the other features indicated enter into the combination.

I will now refer to the preferred form of clutch mechanism by which these operating-wheels $a\ b\ c\ d$ are clutched or connected with the car-axles, respectively, but would first observe that, while I prefer frictional clutches for this purpose, still my general combination indicated does not depend upon the use of friction-clutches. I have shown two forms of these clutches. The preferred form is that illustrated in Figs. 1 and 2. This form has the preference because it enables me to set the operating-wheels of each axle nearer together, and hence to set the driving-wheels Q and R nearer together and the driving-wheels U and V nearer together. This economy in lateral dimensions leaves greater room in the limited lateral space for the accommodation of the engines and their balance-wheels, as in actual practice they will be used. This is particularly advantageous in the use of large engines of high horse-power.

The other form is shown in Fig. 7, in which the wheels of each pair are farther apart laterally. There is, however, a common feature to each form, namely, each of the operating-wheels, say $a$ and $b$, has a conical friction-flange $a'$ and $b'$. The preferred form, however, has the male members $c'$ and $d'$ of the clutches on separate sleeves $e$ and $f$, whereas in the other form the male members $g$ and $h$ are both mounted on a single sleeve $i$. In either form the sleeve is keyed to the car-axle, as shown at $j$ in Figs. 1, 2, and 3, so as to slide on the axle but rotate with it. In either case, also, each sleeve is grooved to receive a collar $l$, which is sprung into the groove and has trunnions $n$, fitting slots $o$ in the bifurcated ends $p$ of bell-crank levers $q$ in Figs. 1 to 3, and T-levers $r$ in Fig. 7. By operating these levers the male members of the clutches are made to engage or disengage with a pair of operating-wheels $a\ b$. In either case but one clutch of one axle is in engagement at the same time. In the preferred form the clutches are independently operated by separate levers. In the other form the clutches are both operated at the same time by either of the two levers shown, one clutch being brought into engagement by one movement and the other out of engagement, and by a shorter movement both being placed out of engagement. In the preferred form there is also a disk $s$, fixed to the axle. This disk forms a stop against which these wheels press when the clutches engage them, and, incidentally, there is friction between each wheel and said disk when the clutch is in engagement. In the other form collars $v$, held by set-screws on the axle, serve as stops against which the wheels are pressed.

In practice it may be preferable to diametrically divide the wheels $a\ b\ c\ d$, the male clutch members $c'$ and $d'$, and the disk $s$ in order to apply them after both wheels are on the axle, or they may be slipped on before the last wheel is applied to the axle.

Referring now to the means for operating the clutch-levers, it will be seen that I secure to the platform or other convenient part of the car a toothed segment 2 and provide a lever 3, which has a spring hand-detent 4 to lock it to the segment. The lower end of the lever connects with the clutch-operating rod, which consists of sections 5 and 6, coupled as to tensile strain by a sleeve 7 and a spring 8 and adapted to press endwise against each other when pushed upon. Section 6 connects with one of the levers $q$ or one branch of the lever $r$. It screws into one end of the sleeve 7. Section 5 is fitted to slide in the sleeve, and has a shoulder 9, which presses against a spring 8, the other end of the spring being resisted by a plug 10 of the sleeve. The length of section 5 is adjustable through a right and left hand screw-threaded band 11, into which said section and its jaw 12 screw. A pin 13 passes through section 5 and plays in a slot 14 in the sleeve 7 and acts to prevent the sleeve from rotating. In applying the clutch in Fig. 1 the lever is drawn back and a tensile strain exerted on the rod 5, a compressing effect on the spring 8, and through it a tensile strain on the rod 6 and sleeve 7. In unclutching the lever is thrown forward and a pushing strain applied to the rod 5, which eases up the spring until the rod 5 strikes the rod 6, when the latter is pushed back and the clutch drawn out. Thus a spring is interposed between the parts when the rods are being drawn on to force the clutch in. This gives a yielding connection which compensates for lost motion in the parts and any jars incident to the operation. The same operations take place as in the form shown in Fig. 7, except that as one lever moves forward the other moves backward.

Having thus fully described my invention, what I claim as new, and desire to secure by Letters Patent, is—

1. In a street-car motor, the combination with a driving-shaft adapted to rotate continuously in one direction, a counter-shaft rotated thereby in the opposite direction, the car-axles, operating wheels of larger and smaller diameters on each axle, means to connect and disconnect said wheels rotatably with said axles, and connecting mechanism between the driving-shaft and said wheels on one axle, and other connected mechanism between the counter-shaft and said wheels on the other axle, whereby the car may be run in either direction and whereby it may be run with variable speed and power without substantially changing the speed and power of the driving-shaft.

2. In a street-car motor, the combination of the driving-shaft adapted to rotate continuously in one direction, a counter-shaft rotated thereby in the opposite direction, a larger and a smaller sprocket-wheel on the driving-shaft and also on the counter-shaft, the car-axles and a larger and a smaller operating-wheel on each axle, means to rotatably connect either of said operating-wheels with its car-axle, and sprocket-chains connecting the smaller sprocket-wheel of the driving-shaft with the larger operating-wheel of one axle and the larger sprocket-wheel with the smaller driving-wheel of the same axle, and other sprocket-chains connecting the smaller sprocket-wheel of the counter-shaft with the larger operating-wheel on the other axle and a larger sprocket-wheel of the counter-shaft with a smaller operating-wheel of the latter axle.

3. In a street-car motor, the combination with the driving-shaft adapted to rotate continuously in one direction, a counter-shaft rotated thereby in the opposite direction, the car-axles, a larger and a smaller operating-wheel on each car-axle, a connecting mechanism between the driving-shaft and the operating-wheels of one axle, and connecting mechanism between the counter-shaft and the operating-wheels of the other axle, all of said operating-wheels having clutch-surfaces, and a clutch member carried by the axles for each operating-wheel, and operating mechanism for each clutch member extending to the operator's position on the car.

4. In a street-car motor, the combination with the driving-shaft adapted to rotate in one direction, a counter-shaft rotated thereby in the opposite direction, said driving and counter shafts each having sprocket-wheels of different diameters, sprocket-chains on said sprocket-wheels, car-axles, operating-wheels of different diameters on each car-axle with which said chains respectively engage, a clutch-face on each operating-wheel and a clutch member on each axle for each of its operating-wheels, a lever mechanism for operating each clutch member to rotatably connect and disconnect each operating-wheel with its own axle.

5. In a street-car motor, the combination with a car-axle, of operating-wheels of different diameters loosely mounted thereon, a disk fixed to the axle between the wheels and a friction-clutch surface on the outer sides of the wheels, a slidable friction-clutch member rotatably mounted on the axle and means to engage and disengage each member with its operating-wheel.

6. In a street-car motor, the combination with a car-axle, a disk fixed thereon, a sprocket operating-wheel with a conical friction-surface loosely mounted on each side of said disk, one wheel being larger than the other, a friction-clutch member for each wheel slidingly and rotatably mounted on the axle.

7. In a street-car motor, the combination with the car-axle, an operating-wheel, and a friction-clutch on the axle, and means to operate the slidable member of the friction-clutch, said means consisting of a lever mounted on the car, a rod divided into sections, a sleeve and a spring connecting said sections together as to tensile pulls and a part of the sleeve holding the sections to one another when pressed end to end, whereby said rods yield to tensile pulls but resist end-to-end pressure positively, one of said sections being connected to said lever and the other to the slidable member of the clutch through an intermediate device.

8. In a street-car motor, the combination with a divided driving-shaft, of a disk or plate fixed to each division of the shaft, means to connect said disks or plates, and a gear-wheel mounted on said disks or plates and secured thereto.

In testimony whereof I affix my signature in presence of two witnesses.

PHINEAS P. MAST.

Witnesses:
CHAS. R. CRAIN,
C. C. KIRKPATRICK.